United States Patent
Jahnke et al.

(10) Patent No.: US 10,573,907 B2
(45) Date of Patent: Feb. 25, 2020

(54) LOAD-FOLLOWING FUEL CELL SYSTEM WITH ENERGY STORAGE

(71) Applicant: FuelCell Energy, Inc., Danbury, CT (US)

(72) Inventors: Fred Jahnke, Rye, NY (US); Ramakrishnan Venkataraman, Danbury, CT (US); George Berntsen, Shelton, CT (US); Ludwig Lipp, Brookfield, CT (US); Pinakin Patel, Danbury, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 133 days.

(21) Appl. No.: 15/455,875

(22) Filed: Mar. 10, 2017

(65) Prior Publication Data
US 2018/0261857 A1    Sep. 13, 2018

(51) Int. Cl.
*H01M 8/04089* (2016.01)
*H01M 8/04082* (2016.01)
(Continued)

(52) U.S. Cl.
CPC ... *H01M 8/04097* (2013.01); *H01M 8/04201* (2013.01); *H01M 8/0662* (2013.01); *H01M 2008/147* (2013.01); *H01M 2250/10* (2013.01)

(58) Field of Classification Search
CPC .................................................. H01M 8/2495
See application file for complete search history.

(56) References Cited

U.S. PATENT DOCUMENTS 4,620,914 A    11/1986  Abens et al.
5,198,311 A     3/1993  Nakazawa et al.
(Continued)

FOREIGN PATENT DOCUMENTS

CN    101529632 A    9/2009
EP    1 577 972 A1   9/2005
(Continued)

OTHER PUBLICATIONS

Extended European Search Report in EP 15871187.9 dated Oct. 17, 2018 (12 pages).
(Continued)

*Primary Examiner* — Maria Laios
(74) *Attorney, Agent, or Firm* — Foley & Lardner LLP

(57) ABSTRACT

A load-following fuel cell system for a grid system operating with a high penetration of intermittent renewable energy sources includes a baseload power generation module and a load-following power generation module. The baseload power generation module provides a baseload power to the grid system and includes a high-efficiency fuel cell system. The high-efficiency fuel cell system includes a topping module and a bottoming module. The topping module and the bottoming module are connected in series and the topping module provides an exhaust stream to the bottoming module. The load-following power generation module provides a load-following power to the grid system and includes an energy storage system that separates and stores hydrogen contained in the exhaust stream and a power generation system having one or more fuel cells. The power generation system receives the hydrogen from the energy storage system to provide the load-following power.

20 Claims, 3 Drawing Sheets

(51) Int. Cl.
*H01M 8/0662* (2016.01)
*H01M 8/2495* (2016.01)
*H02J 3/28* (2006.01)
*H02J 3/38* (2006.01)
*H01M 8/14* (2006.01)
*H01M 8/1018* (2016.01)

(56) References Cited

U.S. PATENT DOCUMENTS

| | | |
|---|---|---|
| 5,306,577 A | 4/1994 | Sprouse |
| 5,376,470 A | 12/1994 | Sprouse |
| 5,413,878 A * | 5/1995 | Williams ............ B01D 53/326 429/425 |
| 5,506,066 A | 4/1996 | Sprouse |
| 5,518,828 A | 5/1996 | Senetar |
| 5,541,014 A | 7/1996 | Micheli et al. |
| 5,658,448 A | 8/1997 | Lasich |
| 6,211,643 B1 | 4/2001 | Kagatani |
| 6,280,865 B1 | 8/2001 | Eisman et al. |
| 6,365,290 B1 | 4/2002 | Ghezel-Ayagh et al. |
| 6,475,655 B1 | 11/2002 | Nakanishi et al. |
| 6,495,025 B2 | 12/2002 | Velev |
| 6,516,905 B1 | 2/2003 | Baumert et al. |
| 6,569,298 B2 | 5/2003 | Merida-Donis |
| 7,431,746 B2 | 10/2008 | Ma et al. |
| 8,062,799 B2 | 11/2011 | Jahnke et al. |
| 8,080,344 B2 | 12/2011 | Skok et al. |
| 8,236,458 B2 | 8/2012 | Jahnke et al. |
| 8,288,888 B2 | 10/2012 | Hinatsu et al. |
| 8,367,256 B2 | 2/2013 | Jahnke et al. |
| 9,133,553 B2 | 9/2015 | Wilson et al. |
| 9,187,833 B2 | 11/2015 | Wilson et al. |
| 9,249,518 B2 | 2/2016 | Hinatsu et al. |
| 9,303,325 B2 | 4/2016 | Hinatsu et al. |
| 9,478,819 B2 | 10/2016 | Lambrech et al. |
| 9,502,728 B1 | 11/2016 | Farooque et al. |
| 2001/0036566 A1 | 11/2001 | Dekker et al. |
| 2002/0153263 A1 | 10/2002 | Velev |
| 2003/0207161 A1 | 11/2003 | Rusta-Sallehy et al. |
| 2004/0023097 A1 | 2/2004 | Bette et al. |
| 2004/0131902 A1 | 7/2004 | Frank et al. |
| 2004/0142215 A1 | 7/2004 | Barbir et al. |
| 2004/0205032 A1 | 10/2004 | Routtenberg et al. |
| 2004/0229092 A1 | 11/2004 | Take |
| 2005/0164069 A1 | 7/2005 | Margiott et al. |
| 2005/0227137 A1 | 10/2005 | Suga |
| 2006/0228593 A1 | 10/2006 | Grieve et al. |
| 2008/0236647 A1 | 10/2008 | Gibson et al. |
| 2008/0248349 A1 | 10/2008 | McElroy et al. |
| 2009/0246564 A1 | 10/2009 | Mogi et al. |
| 2010/0114395 A1 | 5/2010 | Hinatsu et al. |
| 2010/0216039 A1 | 8/2010 | Jahnke et al. |
| 2012/0034538 A1 | 2/2012 | Jahnke et al. |
| 2013/0130139 A1 | 5/2013 | Kah et al. |
| 2014/0349144 A1 * | 11/2014 | Kim .................... H01M 8/0668 429/9 |
| 2014/0352309 A1 | 12/2014 | Kim et al. |
| 2015/0134277 A1 | 5/2015 | Van Doorn |
| 2015/0285141 A1 | 10/2015 | Manabe et al. |
| 2016/0181647 A1 | 6/2016 | Lambrech et al. |

FOREIGN PATENT DOCUMENTS

| | | |
|---|---|---|
| EP | 1 750 321 A1 | 2/2007 |
| EP | 2 790 256 A1 | 10/2014 |
| JP | 61-085773 A | 5/1986 |
| JP | 05-129033 A | 5/1993 |
| JP | 10-199548 A | 7/1998 |
| JP | 2007-505467 A | 3/2007 |
| JP | 2007-115696 A | 5/2007 |
| JP | 2008-522942 A | 7/2008 |
| JP | 2009-537954 A | 10/2009 |
| KR | 1020090104548 A | 10/2009 |
| KR | 20110064723 A | 6/2011 |
| KR | 20150020463 A | 2/2015 |
| WO | WO-2004/013924 A2 | 2/2004 |
| WO | WO-2012/176176 A1 | 12/2012 |
| WO | WO-2014/140962 A1 | 9/2014 |
| WO | WO-2017/184877 A1 | 10/2017 |

OTHER PUBLICATIONS

International Search Report and Written Opinion in PCT/US2015/066735 dated Feb. 12, 2016 (9 pages).
U.S. Office Action on U.S. Appl. No. 14/578,077 dated Jul. 10, 2015 (17 pages).
U.S. Office Action on U.S. Appl. No. 14/578,077 dated Oct. 20, 2015 (18 pages).
International Search Report and Written Opinion in PCT/US2017/028658 dated Sep. 5, 2017 (14 pages).
International Search Report and Written Opinion in PCT/US2018/021357, dated May 30, 2018 (16 pages).
Communication pursuant to Rule 164(1) EPC in EP 1587118.9 dated Jul. 6, 2018 (13 pages).
K. Harrison, 228th Electrochemical Society Meeting, "Large Active Area Electrolyzer Stack Test Bed—Design, Data and Development", Phoenix, Arizona, Oct. 2015.
2nd International Workshop, Durability and Degradation Issues in PEM Electrolysis Cells and its Components, "Lifetime Prediction of PEM Water Electrolysis Stacks Coupled with RES", Freiburg, Germany, Feb. 2016.
D. Mears, M. Mann, J. Ivy, M. Rutkowski, "Overview of Central H2A Results," 2004 US Hydrogen Conference Proceedings, Apr. 26-29, 2004.
R. McConnell, Generating Hydrogen through Water Electrolysis Using Concentrator Photovoltaics, Conference Paper NREL/CP-520-37093 Jan. 2005.
International Search Report and Written Opinion in PCT/US2018/020577 dated Jun. 11, 2018 (15 pages).
L. Kazmerski, "PV Electrolysis," ASES Renewable Hydrogen Forum Proceedings, Oct. 1, 2003.
Pre-Interview First Office Action dated Feb. 12, 2019 in U.S. Appl. No. 15/449,583 (3 pages).
M. Peters, Presentation at the ACT Expo, "Renewable Hydrogen Production for Use in Hydrogen Fuel Cell Vehicles," Dallas, Texas, May 5, 2015.
M. Peters, Renewable Electrolysis Integrated System Development & Testing; Jun. 8, 2016 Project ID: PD031.
S. Licht, "Solar Water Splitting to Generate Hydrogen Fuel: Photothermal Electrochemical Analysis," J. Phys. Chem. B, 2003, 107, 4253-4260.
W. Summers, "Hydrogen Production Using Nuclear Energy," 15th Annual U.S. Hydrogen Conference Proceedings. Apr. 29, 2004.
Final Office Action on U.S. Appl. No. 15/449,583 Dated Jun. 25, 2019.
Preliminary Rejection in KR2017-7018944 dated Mar. 28, 2019, with English translation (26 pages).
First Office Action in CN2015800695728 dated Aug. 28, 2019, with English translation (23 pages).
Non-Final Office Action in U.S. Appl. No. 16/095,288 dated Nov. 29, 2019.

* cited by examiner

LOAD-FOLLOWING FUEL CELL SYSTEM WITH ENERGY STORAGE

BACKGROUND

This present disclosure relates to fuel cell systems. In particular, the present disclosure relates to a load-following fuel cell system for electrical grids operating on renewable energy sources.

The number of power systems relying on renewable energy sources, such as solar and/or wind sources, has increased in recent years. However, due to the intermittent nature of renewable energy sources and the variable demand of users of an electrical grid, power production from the renewable energy source does not always align with power demand. This results in undesirable supply-demand gaps within the power system. For example, when availability of the renewable energy source is low, the power system may have insufficient power supply capability from the renewable energy source to support the current demand on the grid. In other cases, when availability of the renewable energy source is high, power supply may exceed the current demand on the grid. This excess supply risks potential overload of the grid infrastructure, leading to grid instability, reduced reliability, and poor power quality. Power systems often curtail the use of such excess renewable energy sources to avoid potential overload, resulting in underutilization of available renewable energy.

To address the above concerns, systems capable of providing load-following power to support the grid operating on the renewable energy source are used. However, current systems, which often operate using components such as spinning reserves (e.g., gas turbines), internal combustion engines, and/or batteries, suffer from low efficiency, higher emissions, and slow response times, especially during load cycling.

As penetration of renewable energy increases, the precise and efficient management of power generation for a grid system operating on a renewable energy source is becoming critical. It would be advantageous to provide an efficient and fast-responding load-following system for grid systems operating on a renewable energy source.

SUMMARY

In certain embodiments, a load-following fuel cell system for a grid system operating with a high penetration of intermittent renewable energy sources includes a baseload power generation module and a load-following power generation module. The baseload power generation module is configured to provide a baseload power to the grid system and includes a high-efficiency fuel cell system. The high-efficiency fuel cell system includes a topping module having one or more fuel cells and a bottoming module having one or more fuel cells. The topping module and the bottoming module are connected in series and the topping module is configured to provide an exhaust stream to the bottoming module. The load-following power generation module is configured to provide a load-following power to the grid system and includes an energy storage system configured to separate and store hydrogen contained in the exhaust stream and a power generation system having one or more fuel cells. The power generation system is configured to receive the hydrogen from the energy storage system to provide the load-following power to the grid system.

In one aspect, which is combinable with the above embodiment, a number of the one or more fuel cells of the topping module equals a number of the one or more fuel cells of the bottoming module.

In one aspect, which is combinable with the above embodiments and aspects, the one or more fuel cells of the topping module and the one or more fuel cells of the bottoming module includes one or more high-temperature fuel cells.

In one aspect, which is combinable with the above embodiments and aspects, the one or more high-temperature fuel cells is a molten carbonate fuel cell.

In one aspect, which is combinable with the above embodiments and aspects, the power generation system includes one or more low-temperature fuel cells.

In one aspect, which is combinable with the above embodiments and aspects, the one or more low-temperature fuel cells is a proton exchange membrane fuel cell.

In one aspect, which is combinable with the above embodiments and aspects, a power output of the baseload power generation module is limited to no more than 25% variation.

In one aspect, which is combinable with the above embodiments and aspects, the baseload power provided by the baseload power generation module is substantially constant.

In one aspect, which is combinable with the above embodiments and aspects, the topping module comprises at least one anode and at least one cathode, and the at least one anode is configured to receive a hydrocarbon-based fuel and output the exhaust stream.

In one aspect, which is combinable with the above embodiments and aspects, the energy storage system is configured to receive hydrogen from the topping module.

In one aspect, which is combinable with the above embodiments and aspects, the energy storage system includes an energy recovery device, a compressor, and a storage unit. The energy recovery device is configured to separate the hydrogen from the exhaust stream. The compressor is configured to compress the separated hydrogen from the energy recovery device. The storage unit is configured to store the compressed hydrogen from the compressor.

In one aspect, which is combinable with the above embodiments and aspects, the energy recovery device includes an electrochemical hydrogen separator system.

In one aspect, which is combinable with the above embodiments and aspects, the compressor includes an electrochemical hydrogen compression system.

In one aspect, which is combinable with the above embodiments and aspects, the energy recovery device and the compressor are provided as separate devices.

In other embodiments, a load-following fuel cell system for a grid system with a high penetration of renewable energy sources includes a baseload power generation module and a load-following power generation module. The baseload power generation module is configured to provide a baseload power to the grid system and includes a high-efficiency fuel cell system. The high-efficiency fuel cell system includes a topping module having one or more fuel cells and a bottoming module having one or more fuel cells. The topping module and the bottoming module are connected in series and the topping module is configured to provide an exhaust stream to the bottoming module. The load-following power generation module is configured to provide a load-following power to the grid system and includes an energy storage system and a power generation system. The energy storage system is configured to separate and store hydrogen in the exhaust stream. The power generation system includes one or more fuel cells. In a first operation mode of the load-following fuel cell system, the topping module is configured to provide the exhaust stream to the bottoming module without hydrogen separation. In a second operation mode, the topping module is configured to provide the exhaust stream to the bottoming module with at least a portion of the hydrogen contained in the exhaust stream separated and provide the separated hydrogen stream to the energy storage system. In a third operation mode, the power generation system is configured to receive the hydrogen from the energy storage system to provide the load-following power to the grid system.

In one aspect, which is combinable with the above embodiments and aspects, in the second operation mode, an energy recovery device is configured to separate a maximum amount of hydrogen from the exhaust stream and convey the separated hydrogen to the energy storage system.

In one aspect, which is combinable with the above embodiments and aspects, in the second operation mode, the topping module is configured to provide about 90% power output.

In one aspect, which is combinable with the above embodiments and aspects, in the second operation mode, the energy storage system is configured to receive power from the renewable energy sources.

In one aspect, which is combinable with the above embodiments and aspects, the one or more fuel cells of the topping module and the one or more fuel cells of the bottoming module comprises one or more high-temperature fuel cells, and wherein the one or more fuel cells of the power generation system comprises one or more low-temperature fuel cells.

In yet other embodiments, a method for providing load-following power to a grid system operation with a high penetration of renewable energy sources includes the step of providing a hydrocarbon-based fuel to a baseload power generation module configured to provide a baseload power to the grid system. The baseload power generation module includes a high-efficiency fuel cell system comprising a topping module having one or more fuel cells and a bottoming module having one or more fuel cells connected in series. The method further includes the step of providing at least a portion of hydrogen separated from an exhaust stream outputted from the baseload power generation module to a load-following power generation module. The load-following power generation module includes an energy storage system and a power generation system having one or more fuel cells. The method further includes the steps of storing, via the energy storage system, the separated hydrogen and providing the separated hydrogen from the energy storage system to the power generation system to provide load-following power to the grid system.

DETAILED DESCRIPTION

The present disclosure relates to a high-efficiency fuel cell system with load-following capabilities having high efficiency and rapid ramp-up times for an electrical grid with a high penetration of intermittent, renewable energy sources.

As renewable energy generation increases, it has become increasingly important that power generators operating on an electrical grid are capable of producing power generation according to an optimal net load profile that accounts for the variability in demand and renewable energy sources during a typical day. Power generators that can match power generation to the optimal net load profile can better provide power supply needs to the grid while reducing the various power supply risks to the system.

Figure 1:
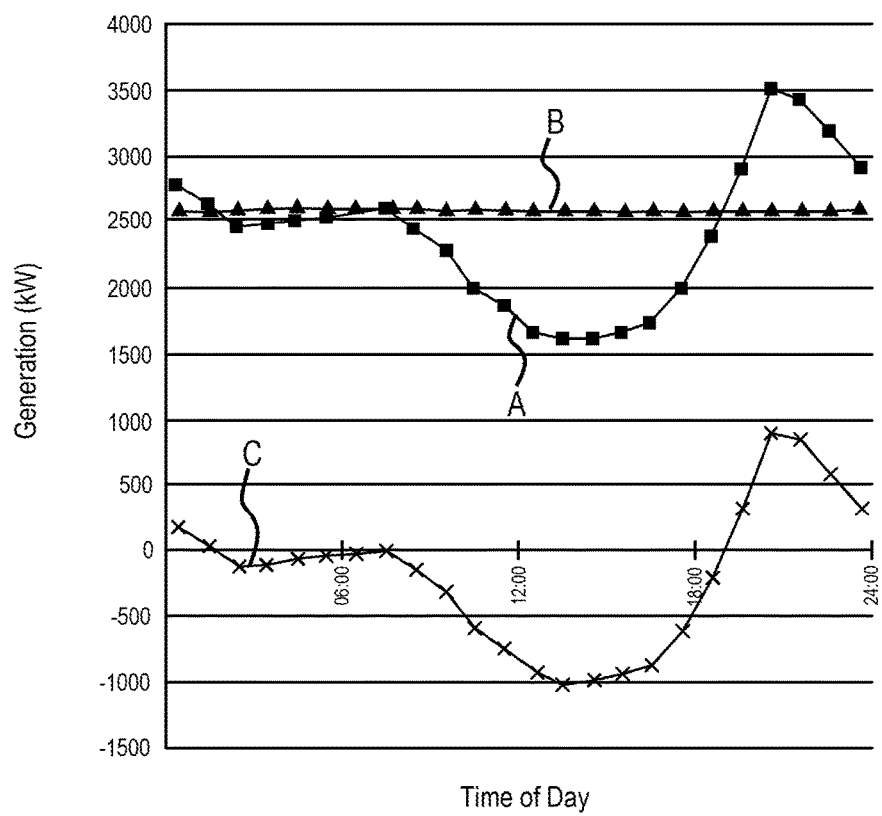
FIG. 1 is a graph showing a net load profile of a load-following fuel cell system for a renewable energy system according to one embodiment of the present invention.

FIG. 1 shows an example of a net load profile of an electrical grid system operating on a renewable energy source during a typical day, which is denoted by curved line A (indicated by squares). As shown in FIG. 1, the net load is expected to reach its minimum in the middle of the day to late afternoon (e.g., between about 12:00 hours to about 18:00 hours) as the power generation capability of the renewable energy source is expected to be at its greatest while expected demand on the grid system is at its lowest. During this time period, because there is a risk of actual power generation from the renewable energy source exceeding the demand on the grid, the risk of overloading the grid is at its greatest during this time period.

As further shown by line A, as the evening progresses (e.g., between about 18:00 hours to about 20:00 hours), net load is expected to have a steep ramp-up progression as energy demand needs on the system are expected to increase while power availability from renewable energy sources is expected to decrease. During this time period, the risk of a power deficit between actual power generation from the renewable energy source and actual power demand is at its greatest, which results in the system having to meet supply needs through other means. However, as shown in FIG. 1, the time period in which demand would likely benefit from additional power generation is relatively short (e.g., a period of about two to four hours) and rapidly increases. Thus, the additional power generation capability of the system requires a fast response time to meet increasing supply needs.

To compensate for the above risks, a load-following fuel cell system according to one embodiment is shown by curved line B (indicated by triangles) and curved line C (indicated by crosses). The load-following fuel cell system is configured to provide power generation to the grid that is capable of matching the expected net load profile shown by line A, reducing the risks detailed above.

As will be described in further detail below, line B represents a baseload power generation module that is configured to provide baseload power support to the grid system. In some embodiments, the baseload power provided by the baseload power generation module is substantially constant. For example, as shown in FIG. 1, the baseload power generation module is configured to provide substantially constant (or baseload) power (e.g., 2500 kW) to the grid such that a minimal level of power demand on the system is met throughout the day. This allows for adequate power support during both low-demand periods (e.g., about 12:00 hours to about 18:00 hours, as shown in FIG. 1) and high-demand periods (e.g., about 18:00 hours to about 20:00 hours). In certain embodiments, to provide a minimal, substantially constant level of power support to the grid, the baseload power generation module is configured to include a power output that is limited to no more than 25% variation during operation of the load-following fuel cell system.

As further shown in FIG. 1, and as described in further detail below, line C represents a load-following power generation module that is configured to adapt to the load requirements of the grid system and the power generation capability of the renewable energy source throughout the day. As shown in FIG. 1, during low-demand periods, the load-following power generation module is configured to receive a hydrogen-containing stream produced by the baseload power generation module and store the hydrogen contained in the stream for energy storage. Because the baseload power generation module provides a set baseload power to the grid during the low-demand periods, any excess power produced by the renewable energy source relative to the current demand, which includes power that would have resulted in an overload risk to the grid, is routed to the load-following power generation module to drive the storage process.

Moreover, as shown in FIG. 1, during high-demand periods, the load-following power generation module is configured to provide supplemental power in addition to the baseload power provided by the baseload power generation module and the power provided by the renewable energy source. The supplemental power produced by the load-following power generation module is configured to provide a rapid ramp-up response in accordance with increases in the demand on the grid, especially in circumstances where the power generation capability of the grid's renewable energy sources decrease. In addition, due to the power offset provided by the baseload power generation module, the power generation requirement of the load-following power generation module during ramp-up periods is reduced, allowing for a more efficient response time and a reduction in the risk of a power generation deficit during high-demand periods.

Figure 2:
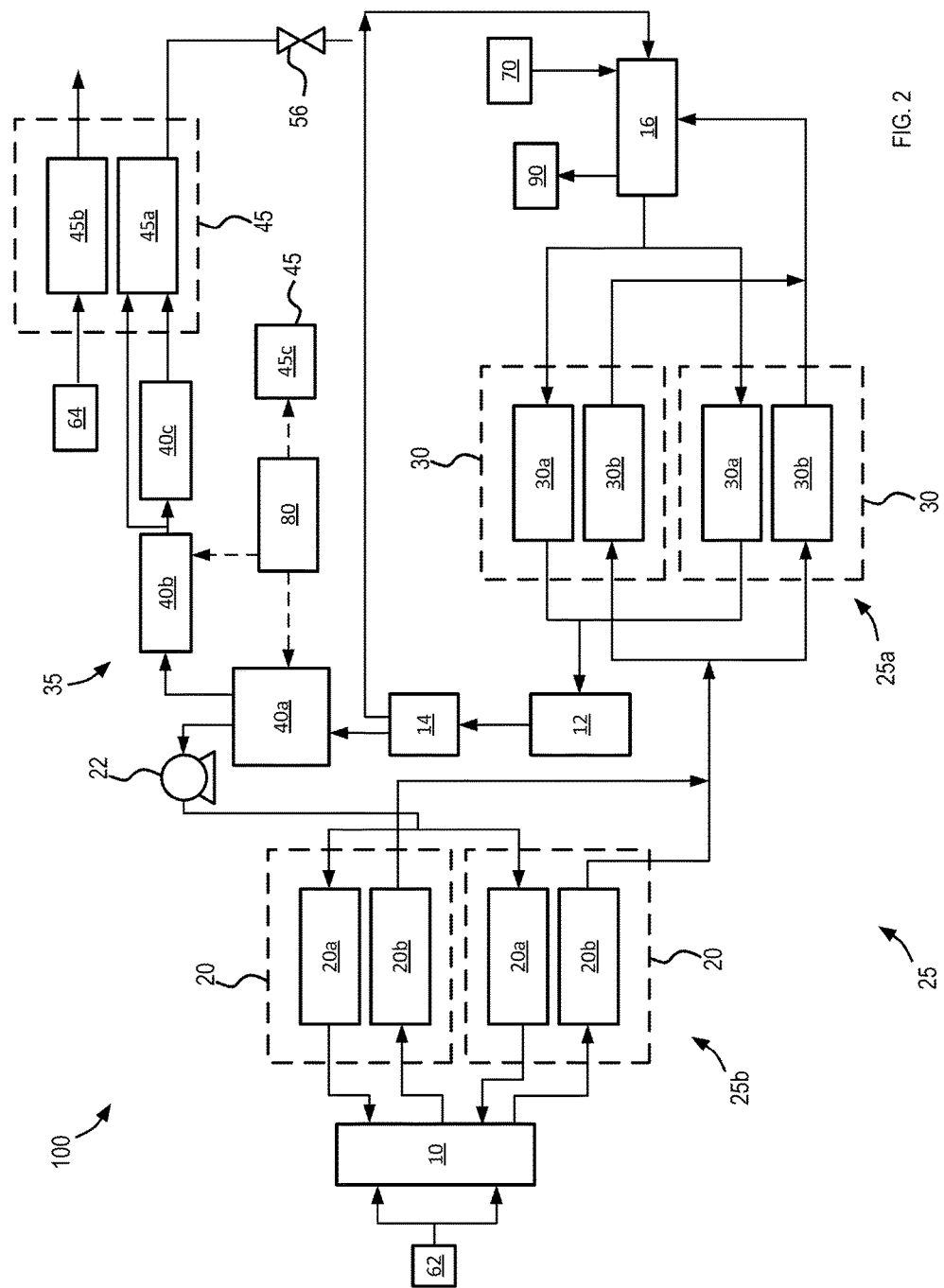
FIG. 2 shows a schematic diagram of the load-following fuel cell system.

FIG. 2 schematically illustrates a load-following fuel cell system 100 according to one embodiment of the present invention. As shown in FIG. 2, the system 100 includes a baseload power generation module comprising a high-efficiency fuel cell (HEFC) system 25 and a load-following power generation module 35 comprising an energy storage system 40a-40c and a power generation system 45. The high-efficiency fuel cell system 25 is configured to provide continual baseload power generation to an electrical grid (not shown) heavily penetrated with renewable energy sources. The load-following module 35 is configured to store energy during periods when renewable energy sources could cause an over-generation condition and provide power generation to the electrical grid when needed.

As shown in FIG. 2, the HEFC system 25 includes two sections or modules, a topping module 25a, which contains one or more topping fuel cells 20, and a bottoming module 25b, which contains one or more bottoming fuel cells 30. The topping module 25a and the bottoming module 25b are connected in series such that a first exhaust stream produced from the topping module 25a is provided to the bottoming module 25b and a second exhaust stream produced from the bottoming module 25b is provided to the topping module 25a. In certain embodiments, the HEFC system 25 is configured to operate in a similar manner as the HEFC system described in U.S. Pat. No. 9,478,819, which is incorporated herein by reference in its entirety. U.S. Pat. No. 9,478,819 discloses two fuel cell stacks connected in series with respect to fuel flow to improve electrical efficiency of a fuel cell system. Fuel is first received into a first fuel cell stack (a topping fuel cell assembly) and the partially spent fuel outputted from the anode portion of the topping fuel cell assembly is directed to the anode portion of a second fuel cell stack (a bottoming fuel cell assembly). The number of fuel cells contained in the topping fuel cell assembly is greater than the number of fuel cells contained in the bottoming fuel cell assembly.

In contrast to the HEFC system disclosed in U.S. Pat. No. 9,478,819, in certain embodiments, the topping module 25a of the HEFC system 25 shown in FIG. 2 contains an equal number of fuel cells as the fuel cells contained in the bottoming module 25b. For example, in the embodiment shown in FIG. 2, the topping module 25a contains two topping fuel cells 30, each having an anode 30a and a cathode 30b, and the bottoming module 25b contains two bottoming fuel cells 20, each having an anode 20a and a cathode 20b. However, while FIG. 2 shows each of the topping module 25a and the bottoming module 25b having two fuel cells, the topping module 25a and the bottoming module 25b may have any number of fuel cells, so long as the fuel cells contained in each of the modules are present in an equal number. In addition, in certain embodiments, the topping module 25a and the bottoming module 25b contain one or more high-temperature fuel cells. For example, the topping module 25a and the bottoming module 25b include one or more molten carbonate fuel cells. By providing an equal number of fuel cells to both the topping module 25a and the bottoming module 25b, the current density and temperature in the bottoming module 25b may be substantially reduced, enabling the bottoming module 25b to be subjected to the load cycling requirements of the system 100 and avoid the thermal-mechanical stresses and associated accelerated fuel cell stack aging that may result from cycling the output of the module.

As further shown in FIG. 2, the load-following system 35 includes an energy storage system 40a-40c and a power generation system 45. The energy storage system may include an energy recovery device 40a, a compressor 40b, and a storage unit 40c. The energy recovery device 40a is configured to extract dilute hydrogen contained within the exhaust stream outputted from the anode portions 30a of the topping module 25a. In certain embodiments, the energy recovery device 40a is an electrochemical hydrogen separator (EHS) system, which is configured to electrochemically separate the hydrogen from the anode exhaust stream of the topping module 25a. By utilizing an EHS system, compression of the exhaust stream is not needed to extract the purified hydrogen, thus increasing the reliability and efficiency of the extraction process and allowing the hydrogen to be stored at relatively low pressure. However, to increase the storage density of the hydrogen in cases where storage availability is limited and/or greater storage capacity is desired, the energy storage system may be provided with a compressor 40b, which is configured to compress the hydrogen prior to being stored in the storage unit 40c. In certain embodiments, the energy recovery device 40a and the compressor 40b may be an electrochemical hydrogen compression (EHC) system, which is configured to electrochemically compress the hydrogen from the anode exhaust stream. In some embodiments, the energy recovery device 40a may be an EHS system and the compressor 40b may be an EHC system. The EHS system and the EHC system may be provided as separate devices (the energy recovery device 40a and the compressor 40b are separate devices) or may be combined as a single device that is capable of both separating and compressing the hydrogen (the energy recovery device 40a and the compressor 40b are an integral device). The EHS system and the EHC system are configured to operate in a manner as described in U.S. Pat. No. 4,620,914, the contents of which are hereby incorporated by reference in its entirety. However, the energy recovery device 40a and/or the compressor 40b are not limited to the EHS system and/or the EHC system and, instead, may include other types of hydrogen separation systems and/or hydrogen compressors. For example, the energy recovery device 40a may be a pressure swing adsorption (PSA) system. In addition, the compressor 40b may be a piston-type compressor, for example.

The storage unit 40c, which may be in the form of storage tank or bladder, is configured to receive separated hydrogen from the energy recovery device 40a and/or the compressor 40b to store the hydrogen for long-term storage. As shown in FIG. 2, the hydrogen stored in the storage unit 40c may be provided as fuel to the power generation system 45. Alternatively, or additionally, the hydrogen stored in the storage unit 40c may be transported from the system 100 for other energy uses to produce additional revenue streams.

The power generation system 45 includes a fuel cell system having one or more fuel cells having an anode portion 45a and a cathode portion 45b. As shown in FIG. 2, the anode portion 45a is configured to receive the hydrogen stored in the storage unit 40c or directly receive separated hydrogen from the energy recovery device 40a and/or the compressor 40b. The cathode portion 45b is configured to receive an air stream 64. In certain embodiments, the fuel cell system comprises a low-temperature fuel cell. For example, the fuel cell system may comprise one or more proton exchange membrane (PEM) fuel cells. As further shown in FIG. 2, the power generation system 45 may further include a battery 45c. The battery 45c may be configured to provide additional energy storage and power generation by receiving excess power 80 generated by the renewable energy source or by receiving power from the HEFC system 25.

During operation of the load-following system 100, fuel 70, in the form of a hydrocarbon-based fuel (e.g., natural gas, syngas, renewable biogas), is introduced into the system 100 and passes through a heat exchanger 16 for heating prior to being provided to the HEFC system 25. The heated fuel 70 is then introduced into the anodes 30a of the topping fuel cells 30. At the same time, cathode exhaust outputted from the cathodes 20b of the bottoming fuel cells 20 is fed into the cathodes 30b of the topping fuel cells 30, producing electricity that is supplied to the grid for baseload power support. Afterwards, anode exhaust is outputted from the anodes 30a and fed into a shift reactor 12, while cathode exhaust is outputted from the cathodes 30b and introduced into the heat exchanger 16 to heat inputted fuel 70 prior to introduction into the anodes 30b. The cooled cathode exhaust is then outputted from the system 100 as exhaust 90.

After receiving the anode exhaust from the anodes 30a of the topping module 25a, the shift reactor 12, which is configured as a water-gas shift reactor, shifts carbon monoxide and water vapor present in the anode exhaust to form hydrogen and carbon dioxide. The output stream of the shift reactor 12 is then outputted to a water recovery unit 14 to recover remaining water vapor present in the output stream. The water recovery unit 14 may comprise any device suitable for separating liquids from gases, such as, but not limited to, vapor-separator condensers, distillation devices, flash separators, cryogenic separators, and combinations thereof. As shown in FIG. 2, the water recovered from the output stream is fed to the water input of to the heat exchanger 16, which vaporizes the water and also heats the inputted fuel 70. The vaporized water and heated fuel are then outputted to the anodes 30a of the topping module 25a. The exhaust from the cathodes 30b of the topping module 25a is inputted into the heat exchanger 16 to provide heat and is outputted from the system 100 as exhaust 90. At the same time, the water-depleted output stream from the water recovery unit 14 is fed into the energy recovery device 40a and the hydrogen-depleted gas stream is then conveyed to an anode exhaust blower 22 of the HEFC system 25. The extracted hydrogen gas is compressed by the compressor 40b of the load-following system 35, depending on the mode of operation of the system 100, which is described below.

In certain embodiments, the system 100 is configured to operate in plurality of energy modes, depending on the power generation needs of the grid. In some embodiments, the system 100 is configured to operate in three modes.

In a first operation mode, the HEFC system 25 is configured to operate at 100% power output. During operation in the first operation mode, the full power generated by the HEFC system 25 is provided to the grid to support electrical demand. As shown in FIG. 2, the hydrogen-depleted anode exhaust output stream outputted the energy recovery device 40a is conveyed to the anode exhaust blower 22, where the output stream is driven and inputted into the anodes 20a of the bottoming fuel cells 20. In this mode of operation, the energy recovery device 40a is not energized and does not extract hydrogen from the gas stream. In the bottoming module 25b, air 62 is further introduced into an oxidizer 10, which oxidizes the anode exhaust from the anodes 20a using the air 62 before being introduced into the cathodes 20b. Electricity produced by the bottoming fuel cells 20 is provided to the electrical grid for baseload power support, in addition to the electricity produced by the topping fuel cells 30. As noted above, the cathode exhaust outputted from the cathodes 20b is then fed into the cathodes 30b of the topping module 25a.

In a second operation mode, the bottoming module 25b of the HEFC system 25 is configured to operate at a reduced power output or at no power output. In some embodiments, the topping module 25a is also configured to operate at a reduced power output (e.g., about 90% output). In certain embodiments, the total output of the HEFC system 25 is reduced by about 25%. During operation in the second operation mode, the anode exhaust from the topping module 25a, which contains hydrogen, is routed to the energy recovery device 40a of the load-following module 35 and the energy recovery device 40a, which is energized, is operated such that the hydrogen extraction may be maximized when the bottoming module 25b stops producing electricity. The energized energy recovery device 40a will also consume electricity to extract hydrogen from the anode exhaust gas stream. In this mode, the reduced power generated by the HEFC system 25 continues to provide baseload power support to the electrical grid, while a portion of power generated by the HEFC system 25 is used to drive the energy recovery device 40a and the compressor 40b of the energy storage system 35 such that hydrogen present in the anode exhaust stream of the topping module 25a is separated and either stored in the storage unit 40c or provided directly to the power generation system 45, depending on demand requirements. As noted above, in some embodiments, HEFC power may be diverted from supplying power to the electrical grid to charging a battery 45c of the power generation system 45 for additional energy storage and/or power generation. During this mode, an overall 40% reduction in system output is possible to match the demand on the grid. In some embodiments, renewable energy source 80 may supply power to the energy recovery device 40a and/or the compressor 40b of the energy storage system 35.

In a third operation mode, the HEFC system 25 is cycled back to operate at 100% power output to provide full baseload power support to the grid. The output stream of the water recovery unit 14 is routed to the energy recovery device 40a (which is not energized), where no hydrogen is extracted and the gas stream is conveyed to the anode exhaust blower 22 and then to the bottoming module 25b of the HEFC system 25. The energy recovery device 40a and the compressor 40b of the energy storage system 35 do not consume electricity in this mode. At the same time, the power generation system 45 becomes operational. Hydrogen stored in the storage unit 40c is provided to the anode 45a of the fuel cell, while air 64 is supplied to a cathode 45b, resulting in the production of electricity, which may be used to support the grid during high-demand periods, especially during high ramp-up progression. As shown in FIG. 2, a valve 56 may be provided to regulate the flow of the stored hydrogen into the fuel cell of the power generation system 45. In addition, as noted above, in certain embodiments, energy stored in the battery 45c may further be used as additional power support to the grid.

Figure 3:
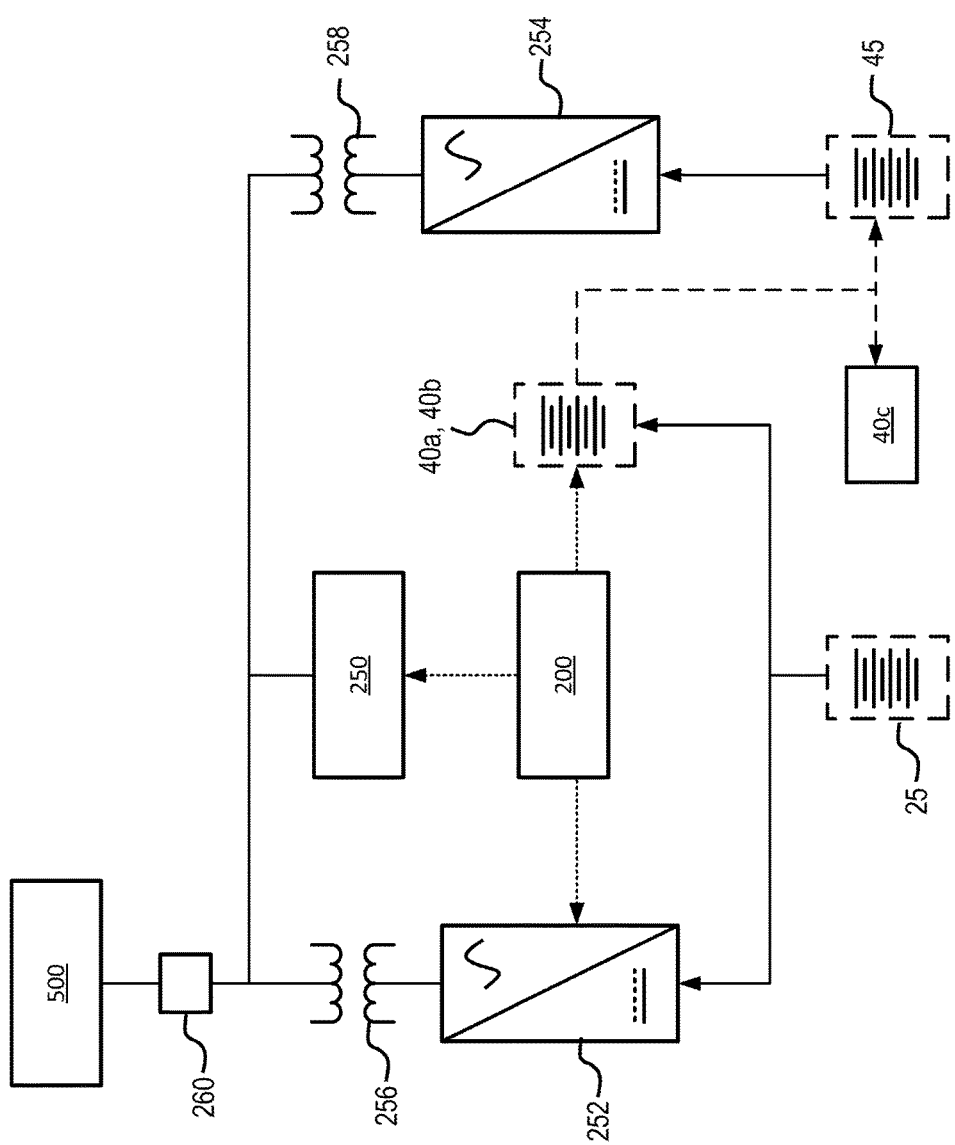
FIG. 3 shows a schematic diagram of a control system for the load-following fuel cell system of FIG. 2 according to one embodiment of the present invention.

In certain embodiments, gas flow and electricity production of the load-following fuel cell system 100 is precisely regulated through a control system. FIG. 3 schematically shows a control scheme for the system 100 according to an embodiment of the present invention. As shown in the FIG. 3, the system 100 may be provided with a controller 200 configured to control various gas flow and power flow through the system 100. For example, the controller 200 may be configured to control the electricity used by the energy recovery device 40a and to control the amount of hydrogen that is separated. The controller 200 may also be configured to control the flow rate of the hydrogen stream from the energy recovery device 40a and the compressor 40b to the storage unit 40c and/or the fuel cell of the power generation system 45. In addition, as shown in FIG. 3, the controller 200 is configured to control inverters 252, 254, which are each configured to receive DC electrical output produced by the HEFC system 25 and the power generation fuel cell 45, respectively. As further shown in FIG. 3, transformers 256, 258 may be provided with each of the inverters 252, 254 prior to outputting AC electricity to a breaker 260 and the electrical grid 500. Additionally, the controller 200 may be further configured to control parasitic loads 250 on the system 100.

Embodiments of the load-following fuel cell system 100 described herein provide load-following capabilities for grid systems operating with high penetration of renewable energy sources without sacrificing efficiency and reducing overall emissions. In addition, by providing the high-efficiency fuel cell system 25 as a baseload power generation module, efficiency may be maintained without impacting overall fuel cell stack life. Moreover, the system 100 is highly flexible and may be used for various purposes, such as for a single power plant or scaled-up to multi-MW systems. The system may also be utilized as a grid support installation or a behind-the-meter customer installation.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A load-following fuel cell system for a grid system operating with a high penetration of intermittent renewable energy sources, the system comprising:
 a baseload power generation module configured to provide a baseload power to the grid system, the baseload power generation module comprising:
  a high-efficiency fuel cell system comprising a topping module having one or more fuel cells and a bottoming module having one or more fuel cells,
  wherein the topping module is configured to provide an exhaust stream to the bottoming module; and
 a load-following power generation module configured to provide a load-following power to the grid system, the load-following power generation module comprising:
  an energy storage system configured to separate and store hydrogen contained in the exhaust stream, the energy storage system comprising an energy recovery device configured to separate the hydrogen from the exhaust stream; and
  a power generation system comprising one or more fuel cells, wherein the power generation system is configured to receive the hydrogen from the energy storage system to provide the load-following power to the grid system, wherein the topping module, the energy recovery device, and the bottoming module are connected in series, and wherein with the energy recovery device is provided between the topping module and the bottoming module.

2. The system of claim 1, wherein a number of the one or more fuel cells of the topping module equals a number of the one or more fuel cells of the bottoming module.

3. The system of claim 1, wherein the one or more fuel cells of the topping module and the one or more fuel cells of the bottoming module comprises one or more high-temperature fuel cells.

4. The system of claim 3, wherein the one or more high-temperature fuel cells is a molten carbonate fuel cell.

5. The system of claim 1, wherein the power generation system comprises one or more low-temperature fuel cells.

6. The system of claim 5, wherein the one or more low-temperature fuel cells is a proton exchange membrane fuel cell.

7. The system of claim 1, wherein a power output of the baseload power generation module is limited to no more than 25% variation.

8. The system of claim 1, wherein the baseload power provided by the baseload power generation module is substantially constant.

9. The system of claim 1, wherein the topping module comprises at least one anode and at least one cathode, and the at least one anode is configured to receive a hydrocarbon-based fuel and output the exhaust stream.

10. The system of claim 1, wherein the energy storage system is configured to receive hydrogen from the topping module.

11. The system of claim 1, wherein the energy storage system further comprises:
a compressor configured to compress the separated hydrogen from the energy recovery device; and
a storage unit configured to store the compressed hydrogen from the compressor.

12. The system of claim 1, wherein the energy recovery device comprises an electrochemical hydrogen separator system.

13. The system of claim 11, wherein the compressor comprises an electrochemical hydrogen compression system.

14. The system of claim 11, wherein the energy recovery device and the compressor are provided as separate devices.

15. A load-following fuel cell system for a grid system with a high penetration of renewable energy sources, the system comprising:
a baseload power generation module configured to provide a baseload power to the grid system, the baseload power generation module comprising:
a high-efficiency fuel cell system comprising a topping module having one or more fuel cells and a bottoming module having one or more fuel cells,
wherein the topping module and the bottoming module are connected in series, and
wherein the topping module is configured to provide an exhaust stream to the bottoming module; and
a load-following power generation module configured to provide a load-following power to the grid system, the load-following power generation module comprising:

an energy storage system configured to separate and store hydrogen contained in the exhaust stream; and
a power generation system comprising one or more fuel cells, wherein, in a first operation mode, the topping module is configured to provide the exhaust stream to the bottoming module without hydrogen separation, wherein, in a second operation mode, the topping module is configured to provide the exhaust stream to the bottoming module with at least a portion of the hydrogen contained in the exhaust stream separated and to provide the separated hydrogen stream to the energy storage system, and wherein, in a third operation mode, the power generation system is configured to receive the hydrogen from the energy storage system to provide the load-following power to the grid system.

16. The system of claim 15, wherein, in the second operation mode, an energy recovery device is configured to separate a maximum amount of hydrogen from the exhaust stream and convey the hydrogen to the energy storage system.

17. The system of claim 15, wherein, in the second operation mode, the topping module is configured to provide about 90% power output.

18. The system of claim 15, wherein, in the second operation mode, the energy storage system is configured to receive power from the renewable energy sources.

19. The system of claim 15, wherein the one or more fuel cells of the topping module and the one or more fuel cells of the bottoming module comprises one or more high-temperature fuel cells, and wherein the one or more fuel cells of the power generation system comprises one or more low-temperature fuel cells.

20. A method for providing load-following power to a grid system operating with a high penetration of renewable energy sources, the method comprising:
providing a hydrocarbon-based fuel to a baseload power generation module configured to provide a baseload power to the grid system, wherein the baseload power generation module comprises a high-efficiency fuel cell system comprising a topping module having one or more fuel cells and a bottoming module having one or more fuel cells;
providing at least a portion of hydrogen separated from an exhaust stream outputted from the baseload power generation module to a load-following power generation module, wherein the load-following power generation module comprises an energy storage system and a power generation system having one or more fuel cells;
storing, via the energy storage system, the separated hydrogen; and
providing the separated hydrogen from the energy storage system to the power generation system to provide load-following power to the grid system, wherein
the energy storage system includes an energy recovery device that separates the hydrogen from the exhaust stream,
the topping module, the energy recovery device, and the bottoming module are connected in series, and
the energy recovery device is provided between the topping module and the bottoming module.

* * * * *